United States Patent Office 3,450,754
Patented June 17, 1969

3,450,754
PURIFICATION OF FORMIC ACID
Ben W. Kiff, Ona, W. Va., assignor to United States Rubber Company, New York, N.Y., a corporation of New Jersey
No Drawing. Filed Dec. 12, 1966, Ser. No. 600,734
Int. Cl. C07c 53/02, 51/00
U.S. Cl. 260—542    4 Claims

ABSTRACT OF THE DISCLOSURE

This invention relates to a process for the purification of formic acid to remove minute amounts of color forming impurities. Purification is achieved by treating the formic acid with a minor amount of hydrogen peroxide or alkali metal dichromate such as sodium or potassium dichromate at an elevated temperature, as set forth in the following specification. Formic acid has many known uses.

In the commercial synthetic methods for the production of formic acid by the oxidation of aliphatic alkanes, complex mixtures are produced that are subsequently resolved into their separate components by the use of complex series of extractions and distillations. Notwithstanding the extensive procedures used to separate the formic acid from the complex reaction mixtures trace amounts of impurities do remain in the acid and present problems.

The liquid phase oxidation of aliphatic alkanes containing from 3 to about 6 carbon atoms is an important commercial process for the manufacture of a plurality of valuable oxygenated compounds. The hydrocarbon oxidation reaction produces a mixture of products in which acetic acid is usually present in largest amount together with several other components, such as acids, ethers, ketones, aldehydes, etc. The individual components in this mixture are separable by means of a complicated series of extractions and distillations and among the co-products obtained and recovered is formic acid.

While formic acid is recovered and refined to yield the acid having a fairly high purity in excess of 95 percent, the refined distilled acid contains small amounts of deleterious impurities which cannot be removed by the physical means of extraction and distillation normally employed.

The formic acid recovered from the hydrocarbon oxidation by distillation contains trace amounts, usually in the order of parts per million, of unknown impurities which cause the formation of an undesirable color in the formic acid on storage. All previous attempts to remove these impurities have been without avail. As a result, commercial use of formic acid obtained by the oxidation process has been restricted to those applications in which the presence of color is not critical, or to those applications involving the immediate use of the formic acid after distillation.

It has now been found that the addition of hydrogen peroxide or sodium dichromate or potassium dichromate to formic acid and subsequently heating the mixture at a temperature above 40° C. will yield acid of acceptable commercial high purity.

In the process of this invention hydrogen peroxide or the alkali metal dichromate is added to the crude or semi-refined formic acid obtained from the hydrocarbon oxidation reaction and the mixture is heated for an appreciable period of time. The formic acid is then distilled and recovered in high purity.

The amount of hydrogen peroxide or alkali metal dichromate required is dependent upon the quantity of impurities present in the starting material. Generally, this amount is at least about twice the stoichiometric amount of the total amount of the impurities present. The concentration thereof ranges from about 0.2 percent to about five percent by weight of the formic acid treated; preferably from about 0.25 percent to about two percent by weight. Larger amounts can be used if desired but the excess hydrogen peroxide or alkali metal dichromate does not serve any practical purpose; smaller amounts are not as effective.

The mixture of acid and hydrogen peroxide or alkali metal dichromate is heated at a temperature of from about 40° C. to about 150° C., or higher; preferably from about 70° C. to about 100° C. The pressure is not critical, and the mixture can be heated at atmospheric or superatmospheric pressure.

The reaction mixture is preferably heated at the indicated temperature for a period of from about 5 minutes to 35 hours, preferably for about 30 minutes to about 24 hours, though heating may not be required. Longer heating periods can be employed with no deleterious effects and slightly shorter periods can be used where a lesser degree of purity is adequate. Shorter heating periods can be effective at higher temperatures. In general as the temperature is increased the time can be decreased. However, it is preferred to operate within the ranges set forth above. The critical factor for the heating period is that it be continued for a period sufficient to permit the reaction to proceed to the extent that the content of color forming impurities is decreased and that the formic acid that is subsequently recovered will pass the color test. This period of time will vary to some extent with the starting material and is dependent upon the concentration of impurities present and the temperature used.

It has also been found that the presence of water in the mixture of acid and hydrogen peroxide or alkali metal dichromate increases the effectiveness of the treatment. The water may be added at any time, before or during the heating of the acid mixture, or after the heating period but before the distillation to recover the purified acid. The amount of water is not critical and generally varies from about 0.25 to about ten percent by weight of the acid to be treated; preferably from about 0.5 to three percent. Higher water concentration is not desirable since it adds to the distillation costs, however, it can be used.

The presence of color forming impurities in the formic acid is determined by placing a sample of the formic acid in a brown bottle and heating at 60° C. The color of the acid is then compared daily with the conventional color standards and the acid is considered satisfactory if the color is not darker than 40 Pt-Co after heating for 168 hours at 60° C. It has been found that since the usual commercial storage conditions are much milder than those used in the accelerated test, a color of 40 Pt-Co after 168 hours at 60° C. is a reasonable correlation with 20 Pt-Co for prolonged storage at ambient conditions, which is the color specification generally desired for commercial refined formic acid.

The following examples further serve to illustrate this invention.

EXAMPLES 1-6

Semi-refined formic acid of 99.5 percent purity and containing a total of about 0.5 percent acetic acid and water and about 20 parts per million of unknown color forming impurities was placed in a reaction vessel and 0.25 percent by weight thereof of hydrogen peroxide was added. The mixture was heated at 100° C. for one hour and then distilled to recover the purified formic acid. The purified acid was tested for the presence of color forming impurities by the procedure hereinbefore described. At the same time, the untreated semi-refined formic acid was similarly tested for control purposes.

Additional runs were carried out using 0.5 percent hydrogen peroxide and varying the reaction time. All of the results are set forth below.

| Example | Control | 1 | 2 | 3 | 4 | 5 |
|---|---|---|---|---|---|---|
| Hydrogen peroxide, percent | 0 | 0.25 | 0.5 | 0.5 | 0.5 | 0.5 |
| Reaction time, min. at 100° C | | 60 | 60 | 60 | 0 | 10 | 30 |
| Pt-Co color after heating at 60° C., No of hours: | | | | | | |
| 0 | 40 | 0 | 5 | 5 | 5 | 0 | 0 |
| 24 | 50 | 5 | 5 | 5 | 5 | 5 | 5 |
| 48 | 80 | 5 | 5 | | | 5 | 5 |
| 72 | (¹) | 30 | | | | | 15 |
| 120 | | | 10 | 5 | 10 | | |
| 144 | | 40 | 10 | 5 | 20 | | |
| 168 | | 50 | 20 | 15 | 25 | 15 | 40 |
| 240 | | | 40 | 15 | 35 | | |

¹ 1-Gardner.

EXAMPLES 7-13

The semi-refined formic acid was purified by treatment with sodium dichromate. The procedure followed was similar to that set forth for Examples 1 to 6. The use of potassium dichromate gives similar results. The data is set forth below and should be compared to the control results recorded above.

| Example | 7 | 8 | 9¹ | 10 | 11 | 12 | 13 |
|---|---|---|---|---|---|---|---|
| Sodium dichromate, percent | 0.1 | 0.25 | 0.25 | 0.5 | 0.5 | 0.5 | 0.5 |
| Reaction time, min. at 100° C | 60 | 60 | 60 | 0 | 10 | 30 | 60 |
| Pt-Co Color after heating at 60° C., No. of hours: | | | | | | | |
| 0 | 0 | 0 | 0 | 5 | 0 | 0 | 0 |
| 24 | 5 | 5 | 5 | 5 | 5 | 5 | 5 |
| 48 | 10 | 15 | 10 | | 15 | | 10 |
| 120 | | | | 10 | | | |
| 144 | | | | | | 15 | |
| 168 | 20 | 15 | 20 | 25 | 20 | | |
| 240 | 40 | 30 | 30 | 35 | | | 20 |

¹ 1% water added to reaction mixture.

What is claimed is:

1. A process for purifying formic acid obtained by the oxidation of aliphatic alkanes containing 3 to about 6 carbon atoms which comprises contacting said acid with from about 0.2 percent to about 5 percent by weight of a member selected from the group consisting of hydrogen peroxide and alkali metal dichromate for a period of time of about 5 minutes to 35 hours to react with the color forming impurities initially present at a temperature from about 40° C. to 150° C. and subsequently recovering the purified acid.

2. A process as claimed in claim 1 wherein water is added to the mixture.

3. A process as claimed in claim 1 wherein the mixture comprises essentially formic acid and hydrogen peroxide.

4. A process as claimed in claim 1 wherein the mixture comprises essentially formic acid and sodium dichromate.

References Cited

UNITED STATES PATENTS 2,255,421   9/1941   Groll et al. _____ 260—540

LORRAINE A. WEINBERGER, *Primary Examiner.*

V. GARNER, *Assistant Examiner.*

U.S. Cl. X.R.

260—533

UNITED STATES PATENT OFFICE
CERTIFICATE OF CORRECTION

Patent No. 3,450,754

June 17, 1969

Ben W. Kiff

It is certified that error appears in the above identified patent and that said Letters Patent are hereby corrected as shown below:

In the heading to the printed specification, lines 3 to 5, "assignor to United States Rubber Company, New York, N. Y., a corporation of New Jersey" should read -- assignor to Union Carbide Corporation, a corporation of New York --.

Signed and sealed this 21st day of April 1970.

(SEAL)
Attest:

Edward M. Fletcher, Jr.
Attesting Officer

WILLIAM E. SCHUYLER, JR.
Commissioner of Patents